July 6, 1965
R. W. ELLIOTT ETAL
3,192,612
METHOD OF CONSTRUCTING PLASTIC-LINED CONDUIT
Filed April 5, 1963
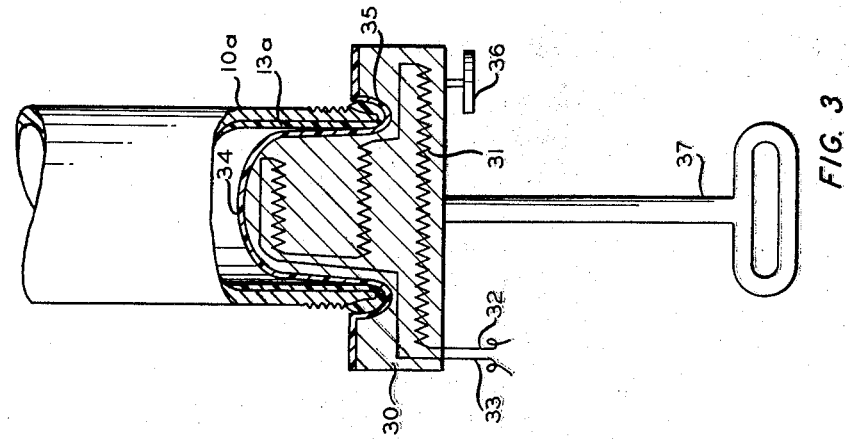
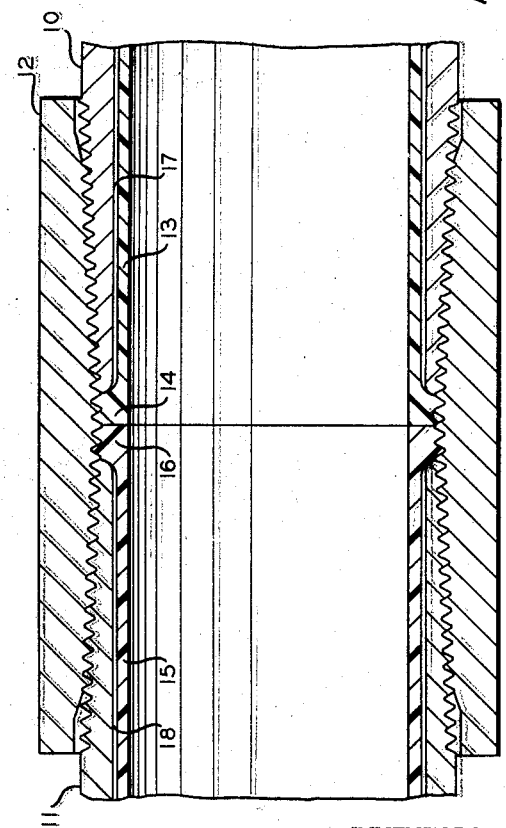
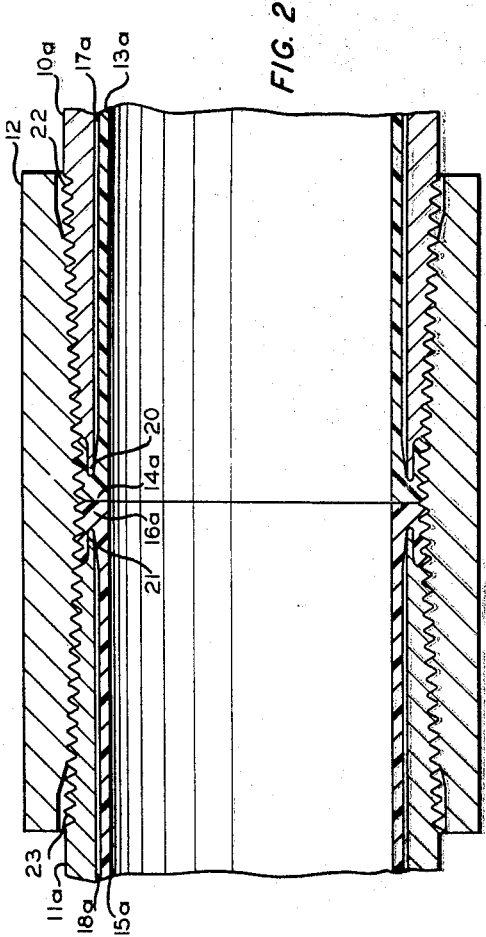
INVENTORS
R. W. ELLIOTT
G. G. HEBARD
BY *Young & Quigg*
ATTORNEYS

United States Patent Office 3,192,612
Patented July 6, 1965

3,192,612
METHOD OF CONSTRUCTING PLASTIC-LINED CONDUIT
Ralph W. Elliott and Glen G. Hebard, Bartlesville, Okla., assignors to Phillips Petroleum Company, a corporation of Delaware
Filed Apr. 5, 1963, Ser. No. 270,856
2 Claims. (Cl. 29—157)

This invention relates to a method of constructing conduit having a thermoplastic lining for protection of the conduit from corrosion in service wherein corrosive fluids are transported through the conduit. The invention also relates, in another aspect, to a method of constructing a thermoplastic conduit enclosed in a reinforcing metal, or other pressure resistant material, casing. Still another aspect of the invention is in a method for securing a thermoplastic liner in a pressure resistant conduit.

For many years pipes and other conduits have been lined with hydraulic cement and such cement-lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported, cement-lined steel pipe has been found to be very little better than unlined steel pipe. Such bacteria have been found beneath the cement lining of cement-lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

Various proposals have been made for combining thermoplastic linings with materials such as hydraulic cements, e.g., hydraulic cement or other material occupying the annulus between the metal conduit and the thermoplastic lining of the conduit. Other proposals have included thermoplastic linings for metal conduits wherein the sections of conduit are connected by flange-type connections wherein the ends of the thermoplastic liner are secured to the conduit by means of the flanged connection. Some of these proposals have proven successful in controlling the corrosion of steel pipe in corrosive service; however the expense involved in producing such conduit has prevented widespread use and, furthermore, conduits containing hydraulic cement liners or partial liners must be protected from blows or vibration which would fracture the cement.

We have now discovered a method for the fabrication of plastic-lined conduits having threaded connections whereby the liner is sealed to each individual section of conduit so that the conduit can be handled and employed in a conventional manner wherever threaded conduits are indicated. Broadly, the invention contemplates a section of conduit such as a steel pipe having a plastic liner therein which liner extends past the threaded ends of the pipe with the extending ends of the liner being threaded to match the threads of the steel pipe. When the sections of pipe are made up using conventional steel collars, the extending threaded ends of the plastic liner butt against each other to form a seal.

An object of this invention is to provide a simple and economical method for lining a conduit with thermoplastic material. It is also an object of the invention to provide a simple method for reinforcing a thermoplastic tube with a pressure-resistant casing. A further object of the invention is to provide a method of constructing a thermoplastic-lined conduit wherein the annulus between the thermoplastic liner and the metal conduit is hermetically sealed. Still another object of this invention is to provide a method of constructing a plastic-lined, threaded conduit capable of being handled and employed in the conventional manner of handling and employing unlined steel pipe or other types of threaded conduit. Other objects and advantages will be apparent to one skilled in the art upon consideration of the description of the invention and the attached drawing wherein:

FIGURE 1 is a sectional elevation of a coupling and pipe connection utilizing sections of pipe according to the invention;

FIGURE 2 illustrates a preferred embodiment of the coupling and pipe connection of FIGURE 1; and FIGURE 3 is a cross-sectional elevation of a device for forming the seal between the thermoplastic liner and the metal conduit according to the invention.

Referring now to FIGURE 1, a section of metal conduit 10 is connected to a section of metal conduit 11 by a metal coupling 12. A section of thermoplastic conduit 13 is positioned in conduit 10 so as to extend over the end thereof and has a threaded portion 14 at the end thereof to engage the threads of coupling 12. A section of thermoplastic conduit 15 is positioned in conduit 11 so as to extend past the end thereof and has a threaded portion 16 at the end portion extending past the conduit 11 which is threaded so as to engage the threads of coupling 12.

The thermoplastic liner end portions 14 and 16 provide a seal between the interior of the thermoplastic lining and the annulus 17 between the liner section 13 and the conduit section 10 and also between the interior of the thermoplastic liner and the annulus 18 between thermoplastic section 15 and the metal conduit section 11. The end portions 14 and 16 are forced together into sealing contact by making up the metal conduit sections 10 and 11 in the coupling 12; and, furthermore, the normal interference between the threads of the coupling and the threads of the conduit sections, both thermoplastic and metal, provides another seal between the interior of the thermoplastic liner and the annuluses 17 and 18 as well as between the interior of the thermoplastic liner and the exterior of the metal conduit.

A preferred embodiment of our invention is illustrated in FIGURE 2 wherein a section of metal conduit 10a is connected to a section of metal conduit 11a by threaded coupling 12. The first two or three threads of metal conduits 10a and 11a are removed from the ends of the couplings so as to present a relatively thin lip 20 on conduit section 10a and a similar lip 21 on conduit section 11a. A thermoplastic liner 13a is positioned in metal conduit section 10a and a thermoplastic liner section 15a is positioned in metal conduit section 11a. The extending ends of the thermoplastic liners are softened and turned back over the lips 20 and 21 and threads are then formed on the extended ends of the liners so as to match the threads of the coupling 12 and also the threads on the respective metal conduit sections 10a and 11a. Additional threads indicated at 22 are added to the metal conduit section 10a in lieu of the threads removed to form the lip 20. Similarly, additional threads 23 are added to the metal conduit section 11a in lieu of the threads removed to form the lip 21.

The embodiment of the invention shown in FIGURE 2 provides a more positive seal between the interior of the thermoplastic liner and the annulus between the thermoplastic liner and the metal conduit, as well as between the interior of the thermoplastic liner and the exterior of the metal conduit, because the lips 20 and 21 anchor the thermoplastic liner to the metal conduit securely and also provide a support for the threaded end portions of the thermoplastic liner so that added compression can be applied to the threaded connection between the thermoplastic liner and the metal coupling. A device for softening and turning the extended end of the thermoplastic liner over the end of the metal conduit is illustrated in FIGURE 3. A heater 30, containing a heating element 31 with leads 32 and 33 connected to a source of electrical energy (not shown) is adapted for a sliding fit within the end of the thermoplastic conduit section 13a and is preferably covered on its heating face with a coating of material such as polytetrafluoroethylene to avoid sticking of the softened thermoplastic liner 13a to the heater 30. The heater 30 preferably has a rounded nose section 34 for sliding acces into the end of the thermoplatic liners and a recessed annular groove 35 to turn the softened end of the thermoplastic liner outwardly into a large bead or "donut" of thermoplastic over and around the end of the metal conduit 10a and into the threads on the end of the conduit. A thermometer 36 indicates the temperature of the heater 30 and a handle 37 facilitates manipulation of the device.

Any of the thermoplastic materials such as polyvinylchloride, solid polyolefins, nylon and the like, can be used for making the conduit liners of this invention and a particularly preferred class of materials is the class of solid linear polymers of 1-olefins, particularly linear solid polyethylene and the solid copolymers of ethylene and higher 1-olefins such as propylene, 1-butene, and the like, prepared by the low pressure polymerization of ethylene or copolymerization of ethylene and a higher molecular weight of 1-olefin in the presence of an organic diluent and a solid catalyst. Such polyethylene and copolymers can be prepared by the method described in U.S. Patent 2,825,721, issued March 4, 1958, to J. P. Hogan et al. The threads on steel pipe and steel tubing and the couplings for such pipe and tubing are tapered and sized so as to allow a gap between the ends of the pipe or tubing of about 1 inch in the coupling when the connection is made up power-tight, i.e., made up with suitable wrenches. This 1-inch gap is common for pipe sizes from 1½ inch to 4½ inch outside diameter.

In fabricating the lined pipe sections of the invention the cool thermoplastic section of pipe is inserted in the section of steel pipe. Clearance between the two tubular sections should be the minimum that will allow the insertion of the cool thermoplastic tube into the steel tube. Cooling causes the thermoplastic to shrink and therefore it will be advantageous to cool the thermoplastic section prior to insertion into the steel pipe section. Two or three inches of thermoplastic liner will extend out of each end of the steel pipe section. A heater such as that shown in FIGURE 3 of the drawing can advantageously be employed to soften the extending end of thermoplastic liner and turn it outwardly over the threaded end of the steel pipe so as to form a bead of thermoplastic material over the end of the steel pipe including at least some of the threads on the steel pipe. After the thermoplastic has cooled and solidified the excess thermoplastic is removed and threads are then cut on the thermoplastic liner end to match and extend the threads of the steel pipe. If desired, the threads in the thermoplastic material can be formed to have an interference fit somewhat in excess of the normal interference fit of the steel threads. The steel pipe collar or coupling is now screwed onto the finished end so as to anchor the thermoplastic firmly to the steel pipe at the end portion.

The thermoplastic liner can then be heated to about 150° F. if desired to expand the thermoplastic material and the other extending end of thermoplastic liner can then be softened and turned outwardly over the end of the steel pipe by application of the heating device described. After the turned over end of the thermoplastic liner has cooled and solidified, threads can be formed on the turned over portion of thermoplastic on the second end of the conduit as described with respect to the first end. A thread protector can then be screwed onto the second end of the pipe section for storage or transportation. As the thermoplastic liner cools and contracts, the thermoplastic liner will be pulled tight against the end of the steel pipe.

A more positive seal between the thermoplastic liner and the steel pipe can be obtained by removing from 2 to 5 threads from the end of the steel conduit so as to form a relatively thin lip extending beyond the threads of the steel conduit and having a smaller outside dimension than that of the threaded section. This embodiment of the invention is illustrated in FIGURE 2.

The thermoplastic liner should extend about one-half inch past the end of the steel pipe for pipe sizes from 1½-inch to 4½-inch outside diameter which is one half the gap normally allowed between the pipe ends in a tapered coupling. For sizes other than the above-mentioned sizes the thermoplastic liner should extend one half the normal gap distance inside the coupling for that particular pipe size.

It is a feature of this invention that thermoplastic-lined pipe is provided which can be handled and joined together as though it were unlined steel pipe. This feature saves considerable time and labor expense in the field. The coupling recess is sealed and protected from corrosion by the threaded thermoplastic liner ends which butt together in the center of the coupling. The threaded thermoplastic liner prevents coupling leaks by assuming the contour of the steel threads and thereby acting as its own sealing compound. Polytetrafluoroethylene tape is advantageously used on the steel and thermoplastic threads. The pipe joint can be coupled and uncoupled as often as is necessary when the pipe or tubing is to be moved or is to be uncoupled for any reason.

Another feature of the invention is that any leakage or failure of the steel pipe or the thermoplastic liner will affect only one section because each section is sealed independently of any other section. This type end seal can be used with any standard threaded valve or fitting without expensive pack-off connectors. No special fusion tools or skills, or other special tools or skills, are required when laying a pipe line or running a string of tubing when using the lined conduit sections of this invention.

That which is claimed is:

1. The method of sealing a thermoplastic liner to an externally threaded metal conduit section which comprises removing between 2 and 5 threads from the end of said section so as to leave an unthreaded endmost portion on said threaded end section; positioning said liner in said section so that the liner extends beyond the section end; heating the extending end of said liner sufficiently to soften same and turning same over the section end from which threads have been removed so as to leave a turned liner portion extending about ½-inch beyond the end of the conduit; hardening the turned liner portion; and forming threads on the turned portion of said liner to match the conduit threads.

2. The method of sealing a thermoplastic liner to an externally threaded metal conduit section having the ends threaded to mate with a threaded tapered coupling which comprises removing between two and five threads from each end of said section so as to leave an unthreaded endmost portion on each said threaded end section; positioning said liner in said section so that the liner extends beyond each end of said section; heating the first extending end of said liner sufficiently to soften same; turning the softened liner end outwardly over the first threaded conduit end so that the turned liner portion extends past the end of the conduit about one-half the normal gap distance in the conduit coupling; hardening the turned liner portion; forming threads on the turned portion of said liner to match the conduit threads; heating the liner and conduit to about 150° F.; heating the second extending end of said liner sufficiently to soften same; turning the softened liner end outwardly over the second threaded conduit end so that the turned liner portion extends past the end of the conduit about one-half the normal gap distance in the conduit coupling; hardening the turned liner portion; forming threads on the turned liner portion to match the conduit threads; and cooling the conduit and liner to ambient temperature.

References Cited by the Examiner

UNITED STATES PATENTS

| | | | |
|---|---|---|---|
| 2,086,151 | 7/37 | Bannerman | 285—55 |
| 2,148,747 | 2/39 | Hampe | 29—157 |
| 2,805,872 | 9/57 | Routh | 285—55 |
| 3,020,068 | 2/62 | Constanzo | 285—55 |
| 3,047,937 | 8/62 | De Vecchi | 29—157 |
| 3,098,664 | 7/63 | Waugh | 285—55 |

FOREIGN PATENTS 754,702   8/33   France.

WHITMORE A. WILTZ, *Primary Examiner.*

CARL W. TOMLIN, *Examiner.*